(12) United States Patent
Santillán Perez et al.

(10) Patent No.: US 11,580,405 B2
(45) Date of Patent: Feb. 14, 2023

(54) DOMAIN ADAPTATION OF DEEP NEURAL NETWORKS

(71) Applicant: SAP SE, Walldorf (DE)

(72) Inventors: Erick David Santillán Perez, Leimen (DE); David Kernert, Bruchsal (DE)

(73) Assignee: SAP SE, Walldorf (DE)

( * ) Notice: Subject to any disclaimer, the term of this patent is extended or adjusted under 35 U.S.C. 154(b) by 501 days.

(21) Appl. No.: 16/727,429

(22) Filed: Dec. 26, 2019

(65) Prior Publication Data

US 2021/0201152 A1    Jul. 1, 2021

(51) Int. Cl.
*G06N 3/08*    (2006.01)
*G06N 3/084*    (2023.01)
*G06N 3/04*    (2023.01)
*G06K 9/62*    (2022.01)

(52) U.S. Cl.
CPC .......... *G06N 3/084* (2013.01); *G06K 9/6256* (2013.01); *G06K 9/6262* (2013.01); *G06K 9/6268* (2013.01); *G06N 3/04* (2013.01)

(58) Field of Classification Search
CPC ........ G06N 3/084; G06N 3/04; G06N 3/0454; G06K 9/6256; G06K 9/6262; G06K 9/6268; G06V 10/454; G06V 10/82
USPC .......................................................... 706/20
See application file for complete search history.

(56) References Cited

U.S. PATENT DOCUMENTS

| | | | |
|---|---|---|---|
| 5,497,430 A | 3/1996 | Sadovnik et al. | |
| 9,031,886 B2 | 5/2015 | Heidasch et al. | |
| 9,495,618 B1 | 11/2016 | Tabb | |
| 10,068,171 B2 | 9/2018 | Wshah et al. | |
| 11,170,789 B2* | 11/2021 | Meng | G06N 3/088 |
| 2016/0350336 A1 | 12/2016 | Checka et al. | |
| 2017/0024641 A1* | 1/2017 | Wierzynski | G06N 3/0454 |
| 2018/0024968 A1 | 1/2018 | Clinchant et al. | |
| 2019/0325861 A1* | 10/2019 | Singh | G06N 3/0445 |
| 2020/0167325 A1* | 5/2020 | Carvalho | G06F 16/28 |

(Continued)

FOREIGN PATENT DOCUMENTS

CN    107527068 A    12/2017

OTHER PUBLICATIONS

Ganin, Y. et al., "Domain-Adversarial Training of Neural Networks," Journal of Machine Learning Research, vol. 17, pp. 1-35 (2016).

(Continued)

*Primary Examiner* — Juan A Torres
(74) *Attorney, Agent, or Firm* — Sterne, Kessler, Goldstein & Fox P.L.L.C.

(57) ABSTRACT

Disclosed herein are system, method, and computer program product embodiments for adapting machine learning models for use in additional applications. For example, feature extraction models are readily available for use in applications such as image detection. These feature extraction models can be used to label inputs (such as images) in conjunction with other deep neural network models. However, in adapting the feature extraction models to these uses, it becomes problematic to improve the quality of their results on target data sets, as these feature extraction models are large and resistant to retraining. Approaches disclosed herein include a transfer layer for providing fast retraining of machine learning models.

20 Claims, 6 Drawing Sheets

(56) References Cited

U.S. PATENT DOCUMENTS

2021/0201152 A1* 7/2021 Santillán Perez ...... G06N 3/084

OTHER PUBLICATIONS

"Code repository for the visDA-17 experiments in our paper 'Self-ensembling for Domain Adaptation'" printed from Internet at https://github.com/Britefury/self-ensemble-visual-domain-adapt-photo/, 4 pages, Feb. 19, 2018.
"GitHub—tensorflow/hub: A library for transfer learning by reusing parts of TensorFlow models," printed from https://github.com/tensorflow/hub, 3 pages, Sep. 15, 2020.
"Transfer Learning | Yeeex," printed from Internet at https://yeeex.gitee.io/2018/09/23/Transfer-Learning/, 16 pages, Sep. 23, 2018.
Fang, X. et al., "Domain-Adversarial Residual-Transfer Networks for Unsupervised Cross-Domain Image Classification," retrieved from Internet at https://arxiv.org/pdf/1812.11478.pdf, 12 pages, Dec. 30, 2018.
French, G. et al., "Self-ensembling for visual domain adaptation," retrieved from Internet at https://arxiv.org/pdf/1706.05208.pdf, 20 pages, Sep. 23, 2018.
Ganin, Y. et al., "Domain-Adversarial Training of Neural Networks," Journal of Machine Learning Research 17, pp. 1-35, retrieved from Internet at https://arxiv.org/pdf/1505.07818.pdf, May 26, 2016.
Goodfellow, I. et al., "Generative adversarial networks," retrieved from Internet at https://arxiv.org/pdf/1406.2661.pdf, 9 pages, Jun. 10, 2014.
He, K. et al., "Deep Residual Learning for Image Recognition," retrieved from Internet at https://arxiv.org/pdf/1512.03385.pdf, 12 pages, Dec. 10, 2015.
He, K. et al., "Mask R-CNN," retrieved from Internet at https://arxiv.org/pdf/1703.06870.pdf, 12 pages, Jan. 24, 2018.
Hinterstoisser, S. et al., "On Pre-Trained Image Features and Synthetic Images for Deep Learning," retrieved from Internet at https://arxiv.org/pdf/1710.10710.pdf, 9 pages, Nov. 16, 2017.
Huang, G. et al., "Densely Connected Convolutional Networks," downloaded from Internet at https://arxiv.org/pdf/1608.06993.pdf, 9 pages, Jan. 28, 2018.
Kornblith, S. et al., "Do Better ImageNet Models Transfer Better?" retrieved from Internet at https://arxiv.org/pdf/1805.08974.pdf, 24 pages, Jun. 17, 2019.
Krizhevsky, A. et al., "ImageNet Classification with Deep Convolutional Neural Networks," retrieved from Internet at https://papers.nips.cc/paper/4824-imagenet-classification-with-deep-convolutional-neural-networks.pdf, 9 pages, 2012.
Lecun, Y. et al., "Gradient-Based Learning Applied to Document Recognition," Proc. of the IEEE, pp. 2278-2324, Nov. 1998. 46 pages.
Li, X. et al., "Multi-Layer Domain Adaptation Method for Rolling Bearing Fault Diagnosis," Dec. 7, 2018 18 pages.
Lin, T.-Y. et al., "Focal Loss for Dense Object Detection," retrieved from Internet at https://arxiv.org/pdf/1708.02002.pdf, 10 pages, Feb. 7, 2018.
Liu, W. et al., "SSD: Single Shot MultiBox Detector," retrieved from Internet at https://arxiv.org/pdf/1512.02325.pdf, 17 pages, Dec. 29, 2016.
Long, M. et al., "Learning Transferable Features with Deep Adaptation Networks," retrieved from https://pdfs.semanticscholar.org/8d13/5f7ca95d6a5c735cb0dfea00a73a64fed430.pdf, 9 pages, May 27, 2015.
Mercier, J.P. et al., "Learning Object Localization and 6D Pose Estimation from Simulation and Weakly Labeled Real Images," retrieved from Internet at https://arxiv.org/pdf/1806.06888.pdf, 7 pages, Feb. 21, 2019.
Netzer, Y. et al., "Reading Digits in Natural Images with Unsupervised Feature Learning," retrieved from Internet at http://ufldl.stanford.edu/housenumbers/nips2011_housenumbers.pdf, 9 pages, 2011.
Pan, S. J. and Q. Yang, "A Survey on Transfer Learning," retrieved from Internet at https://www.cse.ust.hk/~qyang/Docs/2009/tkde_transfer_learning.pdf, 15 pages, 2009.
Peng, X. et al., "VisDA: The Visual Domain Adaptation Challenge," retrieved from Internet at https://arxiv.org/pdf/1710.06924.pdf, 17 pages, Nov. 29, 2017.
Redmon, J. et al., "You Only Look Once: Unified, Real-Time Object Detection," retrieved from Internet at https://arxiv.org/pdf/1506.02640.pdf, 10 pages, May 9, 2016.
Ren, S. et al., "Faster R-CNN: Towards Real-Time Object Detection with Region Proposal Networks," retrieved from Internet at https://arxiv.org/pdf/1506.01497.pdf, 14 pages, Jan. 6, 2016.
Szegedy, C. et al., "Rethinking the Inception Architecture for Computer Vision," retrieved from the Internet at https://arxiv.org/pdf/1512.00567.pdf, 10 pages, Dec. 11, 2015.
Tarvainen, A. and H. Valpola, "Weight-averaged consistency targets improve semi-supervised deep learning results," retrieved from Internet at https://arxiv.org/pdf/1703.01780v1.pdf, 8 pages, Mar. 6, 2017.
Tzeng, E. et al., "Adversarial Discriminative Domain Adaptation," retrieved from http://openaccess.thecvf.com/content_cvpr_2017/papers/Tzeng_Adversarial_Discriminative_Domain_CVPR_2017_paper.pdf, 10 pages, Feb. 17, 2017.
Yosinski, J. et al., "How transferable are features in deep neural networks?," retrieved from Internet at https://arxiv.org/pdf/1411.1792.pdf, 14 pages, Nov. 6, 2014.
Zoph, B. et al., "Learning Transferable Architectures for Scalable Image Recognition," retrieved from Internet at https://arxiv.org/pdf/1707.07012.pdf, 14 pages, Apr. 11, 2018.

* cited by examiner

DOMAIN ADAPTATION OF DEEP NEURAL NETWORKS

BACKGROUND

Deep neural networks, such as convolutional neural networks (CNN), show tremendous promise in certain applications. For example, CNNs are very well adapted to image detection and image recognition tasks, and provide excellent results against industry-standard benchmarks.

One of the challenges facing image detection and image recognition developers using deep neural networks is transferring the learning from an existing deep neural network to an application-specific model. Much work has been done in developing these extensive deep neural networks, and their reuse is desirable through adaptation to new applications, rather than generating entirely new training data and training the deep neural network to that data from scratch.

Accordingly, new approaches are needed to simplify the transfer of learning from deep neural networks for use in specific applications.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for domain adaptation of a deep neural network to an applications-specific domain.

In order to train a machine learning model well, significant amounts of training data is needed. When using the data in training, the result that is expected of the machine learning model for each test object must be included as a label—otherwise, there would be no way to verify whether the model is working correctly. For example, if training a model to detect images of bicycles, a data set with images that either include bicycles and that do not include bicycles in them would not be sufficient by itself—the images would also need to be labeled according to whether they do or do not include bicycles. In the event that the model makes an incorrect prediction, the label informs the training algorithm as to what the result should have been, and the model can be retrained in order to improve its accuracy.

Unfortunately, creating these vast training data sets with labels is time consuming. One way image detection training data can be created, for example, involves manually labeling training images according to what the image depicts (e.g., a horse, a bicycle, an airplane, etc.). These labeled training images can then be used by a model, making a prediction as to what the image depicts and comparing its result with the provided label (and adjusting its algorithm accordingly). This manual labeling process may be handled en masse through crowdsourcing approaches, such as CAPTCHA challenges that ask a user to select items that match a label from an image.

A separate approach for creating labeled training images is to generate images specifically to match a certain label. For example, a computer with a 3D model of an airplane may create a variety of images based on this airplane model that can all immediately be labeled as airplane images. This approach is not time consuming at all as it can be entirely streamlined on a computer. However, the resulting images may look quite different from the actual images expected to ultimately be analyzed by the model, and therefore may not provide the best training data. A model trained on a 3D model on an airplane may not be able to clearly identify an airplane in a real photo, for example.

Machine learning of this type, with labels available for images used to train an image detection model for example, is called supervised machine learning. In contrast, unsupervised machine learning lacks such labels, and instead functions by clustering related objects together—in the case of an image detection model, similar images are clustered together. There are also hybrid systems, which use a combination of labeled and unlabeled training data (commonly termed semi-supervised learning).

Figure 1:
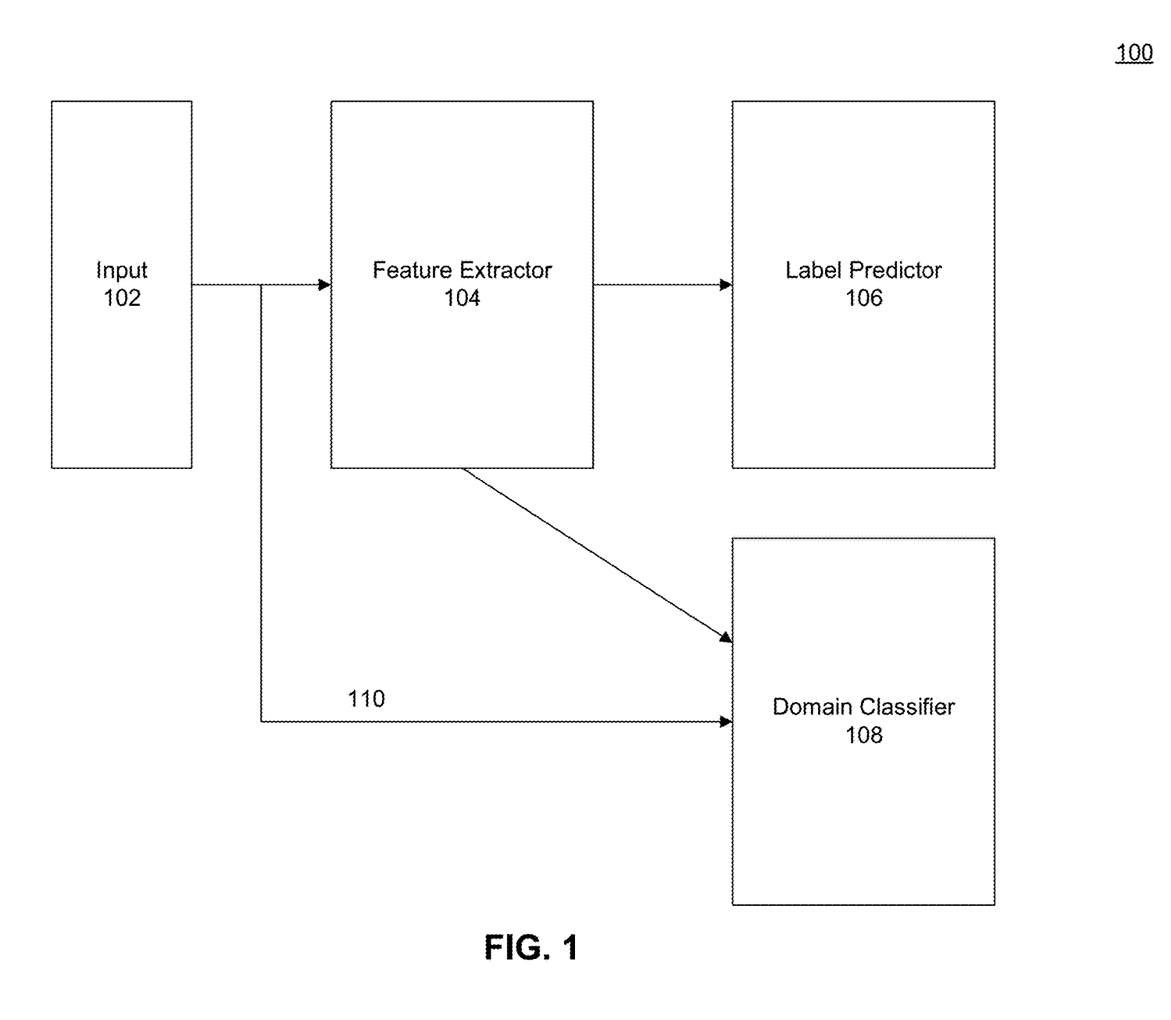
FIG. 1 illustrates a machine learning model, in accordance with an embodiment.

FIG. 1 illustrates a machine learning model 100, in accordance with an embodiment. Machine learning model 100 is adapted to train on a source domain that includes labeled data, in order to execute on a target domain that includes unlabeled data, in accordance with an embodiment. Model 100 includes an input 102, a feature extractor 104, and a label predictor 106, in an embodiment. If model 100 is being deployed for image detection purposes, input 102 may be an image of an airplane. Feature extractor 104 takes input 102 as an input, and provides features from that image as an output.

By way of non-limiting example, feature extractor 104 may be implemented as a convolutional neural network (CNN). A CNN includes multiple levels of neurons, which pass their outputs to all of the neurons of a successive level. In the case of a feature extraction CNN such as feature extractor 104, each level may successively identify increasingly detailed features of an image—a line of an object, a corner, shadows, etc.—that should be output as relevant features. This is the theory of operation of a CNN, as it is not possible to ensure that the CNN is actually performing this task in operation so long as it is producing the desired results as trained. One skilled in the relevant art will appreciate that CNNs may be deployed in other modules disclosed herein in a similar manner as described here with respect to feature extractor 104, and the use of CNNs in this manner is not limited to feature extractor 104.

In accordance with an embodiment, feature extractor 104 may be provided by a commercial provider. Feature extractor 104 may be cloud based, in an embodiment.

Label predictor 106 is able to take features output by feature extractor 104 and use this information to take a best guess at an appropriate label. Label predictor 106 can be implemented as fully-connected layers, in accordance with an embodiment. Label predictor 106 may also be implemented as a CNN, and would have been trained (e.g., with appropriate weights on specific features) to associate a given feature or features with a particular label. For example, if the image provided at input 102 is determined to have feature vectors corresponding to a wing, and perhaps an airline logo as well, by feature extractor 104, then label predictor 106 may strongly correlate these features with the label 'airplane' and guess accordingly.

In accordance with an embodiment, this approach can also be used not only for image classification, but also object recognition (classification coupled with localization)—however, one skilled in the relevant arts will appreciate that the structure of the training models will follow this same structure. And, while examples herein are given in the context of image classification, these same approaches work with models trained for other tasks, such as for detection of text and speech, where artificially generated source domains may be generated.

Once model 100 is trained, with only input 102, feature extractor 104, and label predictor 106, model 100 is able to follow a complete analysis sequence on a given input (e.g., an image) to produce a usable result (e.g., a label for that image). This sequence may also be trained using labeled training data in order to further refine its performance (e.g., through back propagation).

However, when using generated training data (source) in order to train the model to work with unlabeled data (target), domain classifier module 108 may be employed in order to further train the model to determine whether input 102 is sourced from the generated training data or from the unlabeled data set. Domain classifier module 108 may be readily trained—it is always known whether input 102 is sourced from the source data or the target data. Domain classifier 108 may also provide loss information 110 in order to adjust the behavior of feature extractor 104 and improve classification.

Figure 2:
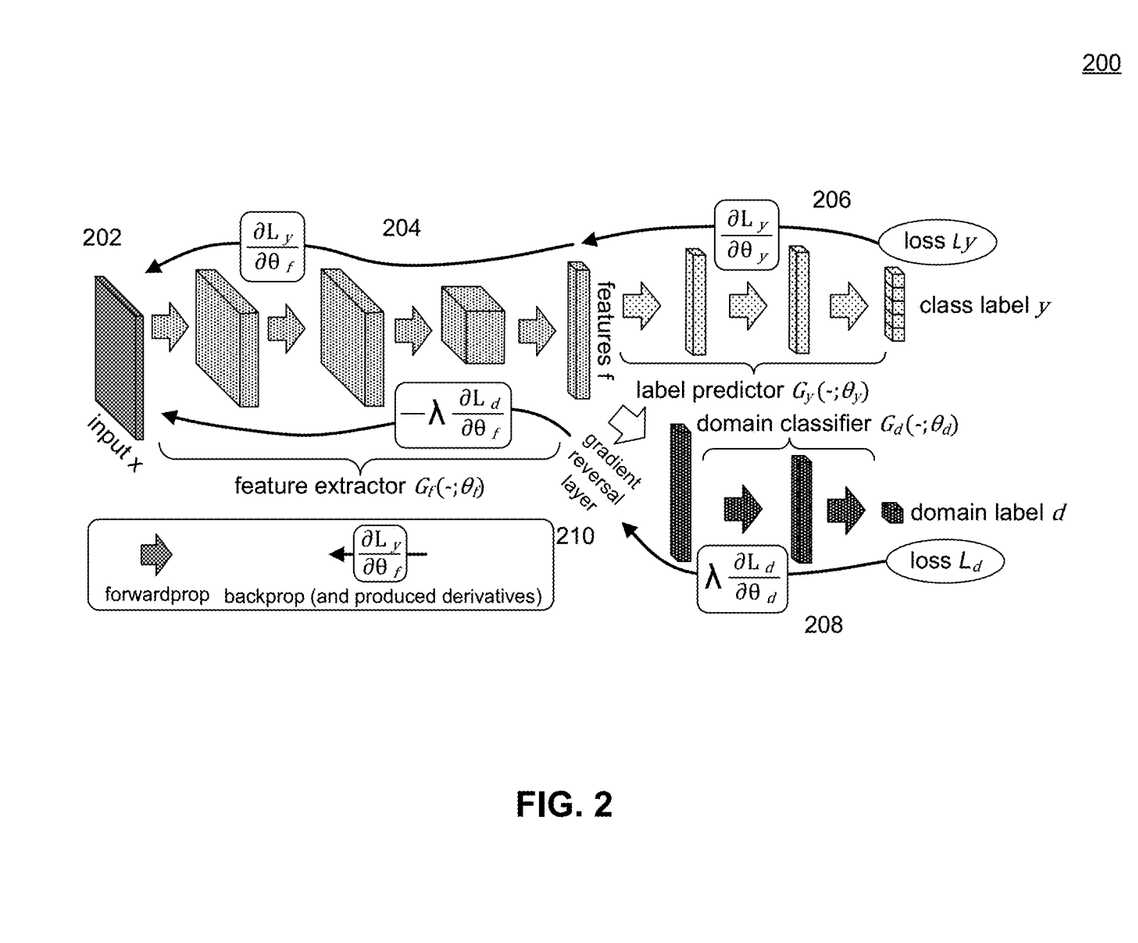
FIG. 2 illustrates back propagation in a machine learning model, in accordance with an embodiment.

This approach is shown in more detail in prior art FIG. 2. FIG. 2 illustrates back propagation in a machine learning model 200, in accordance with an embodiment. In machine learning, models are improved by determining a loss—a success or failure in making a prediction—and using that information to adjust weights and other factors in how the prediction is made. FIG. 2 is sourced from Ganin, Y., et al. "Domain-Adversarial Training of Neural Networks" Journal of Machine Learning Research 17 (2016), illustrating an exemplary approach for reducing over-reliance by a model on features present in source data that are not present in target data, although one skilled in the relevant arts will appreciate that the innovative embodiments disclosed herein may be applied to other domain adversarial models. For example, as shown in model 200, features of input 202 are extracted as feature vector f. Label predictor $G_y(\cdot; \theta_y)$ is used to determine a class label y corresponding to input 202. The loss in that determination, given by $L_y$, is back propagated to neurons of the deep neural networks in use for both label predictor $G_y(\cdot; \theta_y)$, as the derivative $$\frac{\partial L_y}{\partial \theta_y}$$

(back propagation 206) and feature extractor $G_f(\cdot; \theta_f)$, as the derivative $$\frac{\partial L_y}{\partial \theta_f}$$

(back propagation 204).

However, when training using generated source data in order to facilitate prediction on target data, this approach may introduce over-reliance on features present in the source data (which has been generated specifically to match a label, such as the 3D model of an airplane previously described) that are not present in the target data. For example, a 3D render may have unusual shading or appearances of shadows that are not present in real world target data.

In order to reduce this reliance, domain classifier $G_d(\cdot; \theta_d)$ is introduced to determine domain label d. Domain label d is a determination as to whether input 202 is from the source data set or the target data set. If certain features are given excessive weight by feature extractor $G_f(\cdot; \theta_f)$, then it becomes immediately apparent to domain classifier $G_d(\cdot; \theta_d)$ whether input 202 is from the source or target data set. In the case of unusual shading present in all of the 3D rendered source data, feature vectors associated with those images may be given excessive weight, which would hamper determining corresponding objects in the target data set.

Just like with other deep neural networks, domain classifier $G_d(\cdot; O_d)$ exhibits a loss, given by $L_d$, that may be back propagated to neurons of the deep neural network as the weighted derivative $$\lambda \frac{\partial L_d}{\partial \theta_d}$$

(back propagation 208). In the back propagation 208, the λ parameter is a weighting selected to regulate the impact of the domain loss from the back propagation on the overall loss, in accordance with an embodiment. This back propagation improves the ability over time of domain classifier $G_d(\cdot; \theta_d)$ to make a correct prediction as to whether input 202 is from the source data or target data set.

However, with feature extractor $G_f(\cdot; \theta_f)$, it is desirable to minimize those features that make it more likely that domain classifier $G_d(\cdot; \theta_d)$ will make a correct prediction as to whether input 202 is from the source data or target data set. Specifically, features that are only present in one data set or the other should be minimized, in favor of features that strongly correlate across the data sets. Training feature extractor $G_f(\cdot; \theta_f)$ accordingly may be accomplished through a gradient reversal layer 210, in an embodiment. Gradient reversal layer 210 back propagates the effects of loss $L_d$ to feature extractor $G_f(\cdot; \theta_f)$ to encourage more loss—back propagating the loss to neurons of the deep neural network used by feature extractor $G_f(\cdot; \theta_f)$ by the derivative $$-\lambda \frac{\partial L_d}{\partial \theta_f}.$$

This approach allows for the reuse of a feature extractor, such as feature extractor 104 of FIG. 1, in other applications than the specific one for which it was trained. While it is possible to train feature extractor 104 for the specific application, such training requires large amounts of data and many hours of computing time (and possibly human operator time). Ideally, it is possible to use an existing feature extractor 104 that has already been trained, and adapt it to a new application, training only label predictor 106. Moreover, feature extractor 104 may be developed and provided by third-parties specifically for integration in additional applications.

A problem arises, however, in retraining feature extractor 104 based on the back propagation of loss from domain classifier 108 for use in a new application. Specifically, feature extractor 104, trained on large amounts of data, requires significant additional retraining to adapt. Feature extractor 104 may comprise a large number of neurons, organized across a large number of layers in a CNN approach, and gradually accounting for loss information from domain classifier 108 may result in weeks-long retraining cycles.

Figure 3:
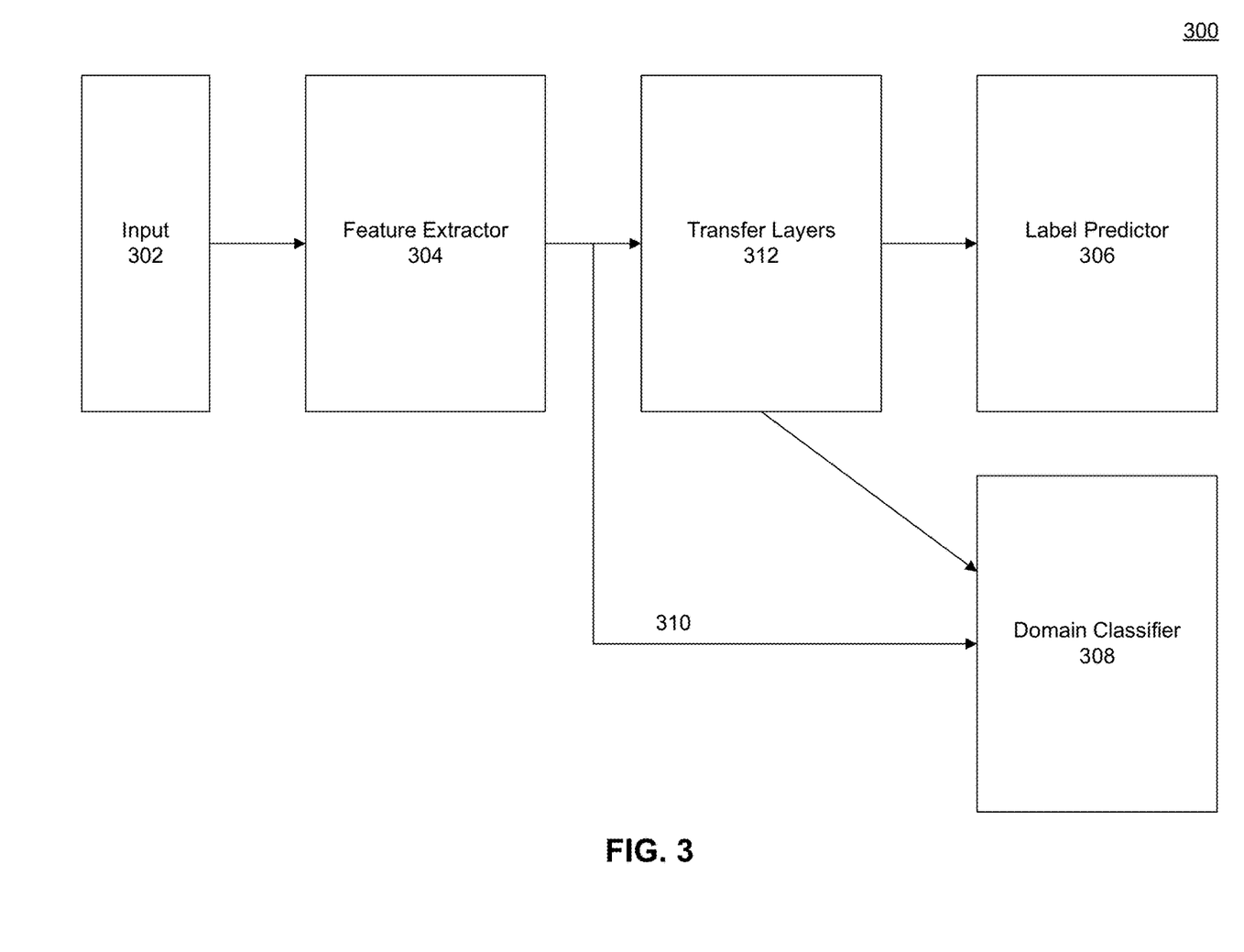
FIG. 3 illustrates a fast adaptation machine learning model, in accordance with an embodiment.

FIG. 3 illustrates a fast adaptation machine learning model 300, in accordance with an embodiment. In model 300, an input 302 is received by feature extractor 304, and the features are ultimately used by label predictor 306 to label input 302 (e.g., to classify an input image). And, as with model 100 of FIG. 1, domain classifier 308 back propagates loss information 310 regarding predictions as to whether input 302 is from a source data set or a target data set.

Unlike model 100 of FIG. 1, however, model 300 includes transfer layers 312, in accordance with an embodiment. Transfer layers 312 are disposed between feature extractor 304 and label predictor 306, and may be implemented as a deep neural network. Transfer layers 312 are configured to adjust to loss information 310 in order to reduce or increase the significance of feature vectors provided by feature extractor 304.

Figure 4:
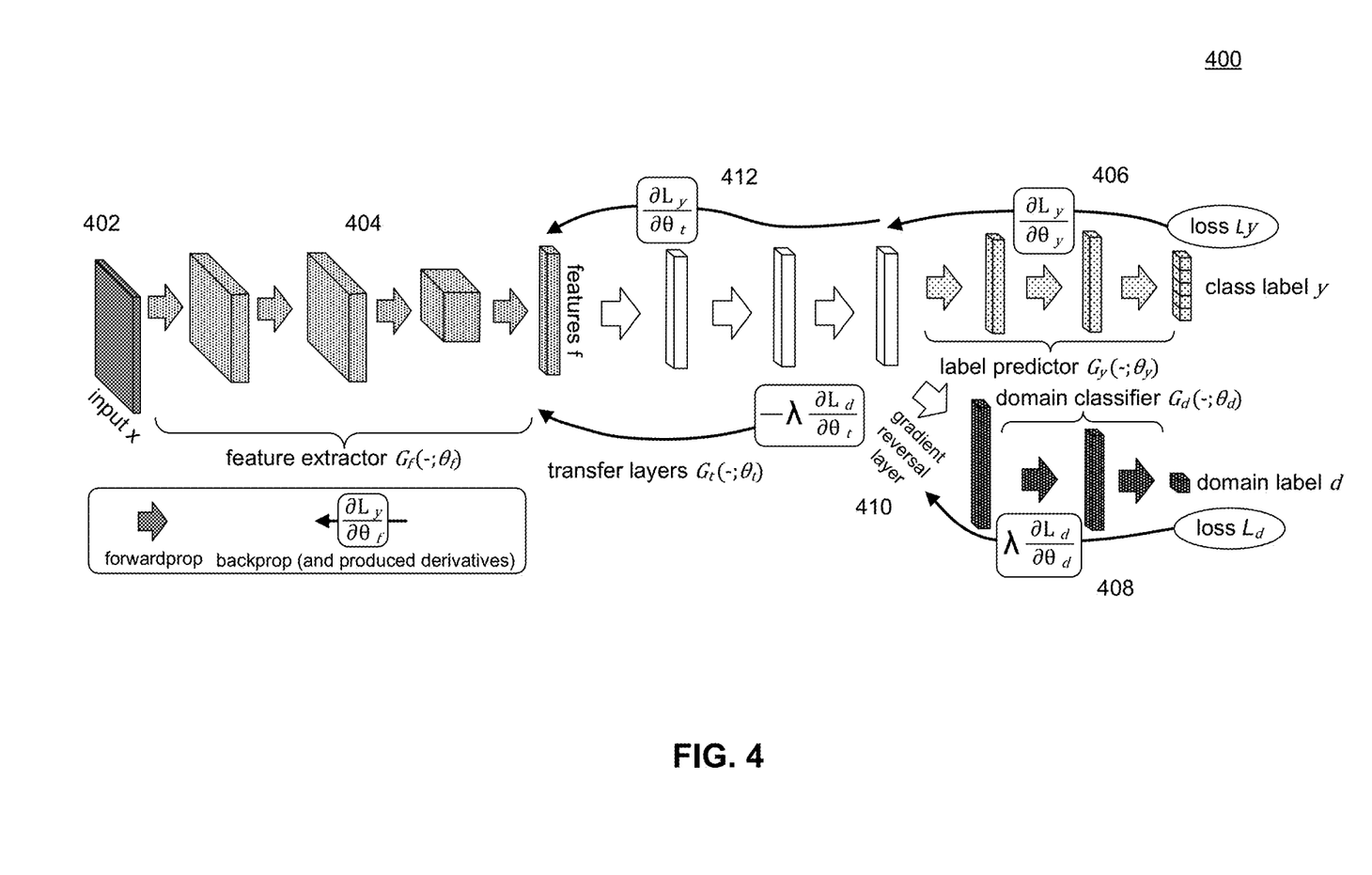
FIG. 4 illustrates back propagation in a fast adaptation machine learning model, in accordance with an embodiment.

FIG. 4 illustrates back propagation in a fast adaptation machine learning model 400, in accordance with an embodiment. In model 400, input 402 is provided to feature extractor 404, which provides feature vector f as a result by $G_f(\cdot; \theta_f)$. However, instead of providing feature vector f directly to label predictor $G_y(\cdot; \theta_y)$ as in model 200 of FIG. 2, feature vector f is provided to transfer layers $G_t(\cdot; \theta_t)$.

Back propagations 406 and 412 correspond to back propagations 204 and 206, respectively, of FIG. 2, in accordance with an embodiment. And, similarly, back propagation 408 and gradient reversal 410 correspond to back propagation 208 and gradient reversal 210 of FIG. 2. Notably, however, the back propagations of back propagation 412 and gradient reversal 410 affect the behavior of transfer layers $G_t(\cdot; \theta_t)$. No back propagation is made to feature extractor 404.

In accordance with an embodiment, transfer layers $G_t(\cdot; \theta_t)$ are implemented by a deep neural network (such as a CNN), of smaller size (often much smaller size), than a deep neural network used to implement feature extractor 404. This allows transfer layers $G_t(\cdot; \theta_t)$ to be rapidly retrained using the back propagations of back propagation 412 and gradient reversal 410, by comparison to the time it would take to retrain feature extractor 404. Moreover, this approach allows feature extractor 404 to be "black-boxed"—it can be used and commercialized for a variety of applications without the need to have insight into its operation or retrain it specifically, and can be fixed (immutable) without either the need or ability to be retrained.

Figure 5:
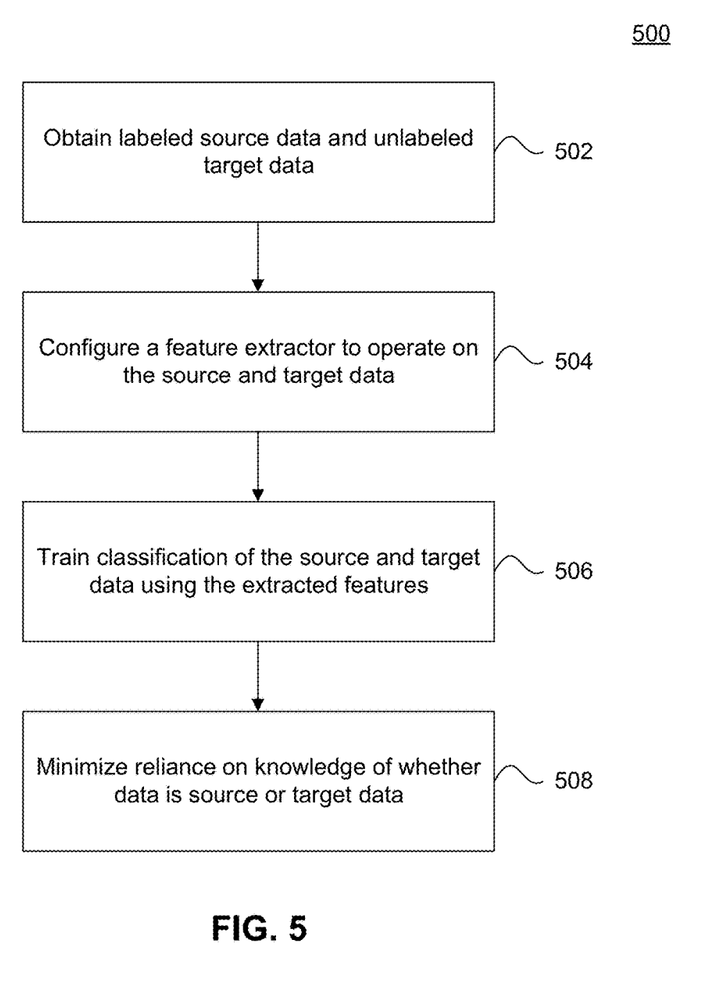
FIG. 5 is a flowchart illustrating steps by which a machine learning model reduces its reliance on domain classifier information, in accordance with an embodiment.

FIG. 5 is a flowchart 500 illustrating steps by which a machine learning model reduces its reliance on domain classifier information, in accordance with an embodiment. This machine learning model is adapted to a new application, so at step 502 labeled source data and unlabeled target data are obtained for use in training the model. At step 504, a feature extractor is configured to operate on the training data from step 502. Classification of the training data is trained at step 506 using features extracted by the feature extractor, in accordance with an embodiment. Then, at step 508, over time the classification processes' reliances on knowledge of the training data being source or target data is minimized.

This approach is termed 'domain-adversarial,' because two separate back propagations are used to improve the training of feature extractor 104 of FIG. 1, or transfer layers 312 of FIG. 3. The back propagation information from label predictor 106/306 is used to improve the accuracy of label prediction, while the back propagation information from domain classifier 108/308 is used to worsen the accuracy of domain prediction. Initially, feature extractor 104 or transfer layers 312 are dependent on domain classifier 108/308 to provide information needed to make accurate label predictions by label predictor 106/306. However, over time, this reliance on domain classifier 108/308 can be reduced, as per step 508 of FIG. 5.

Figure 6:
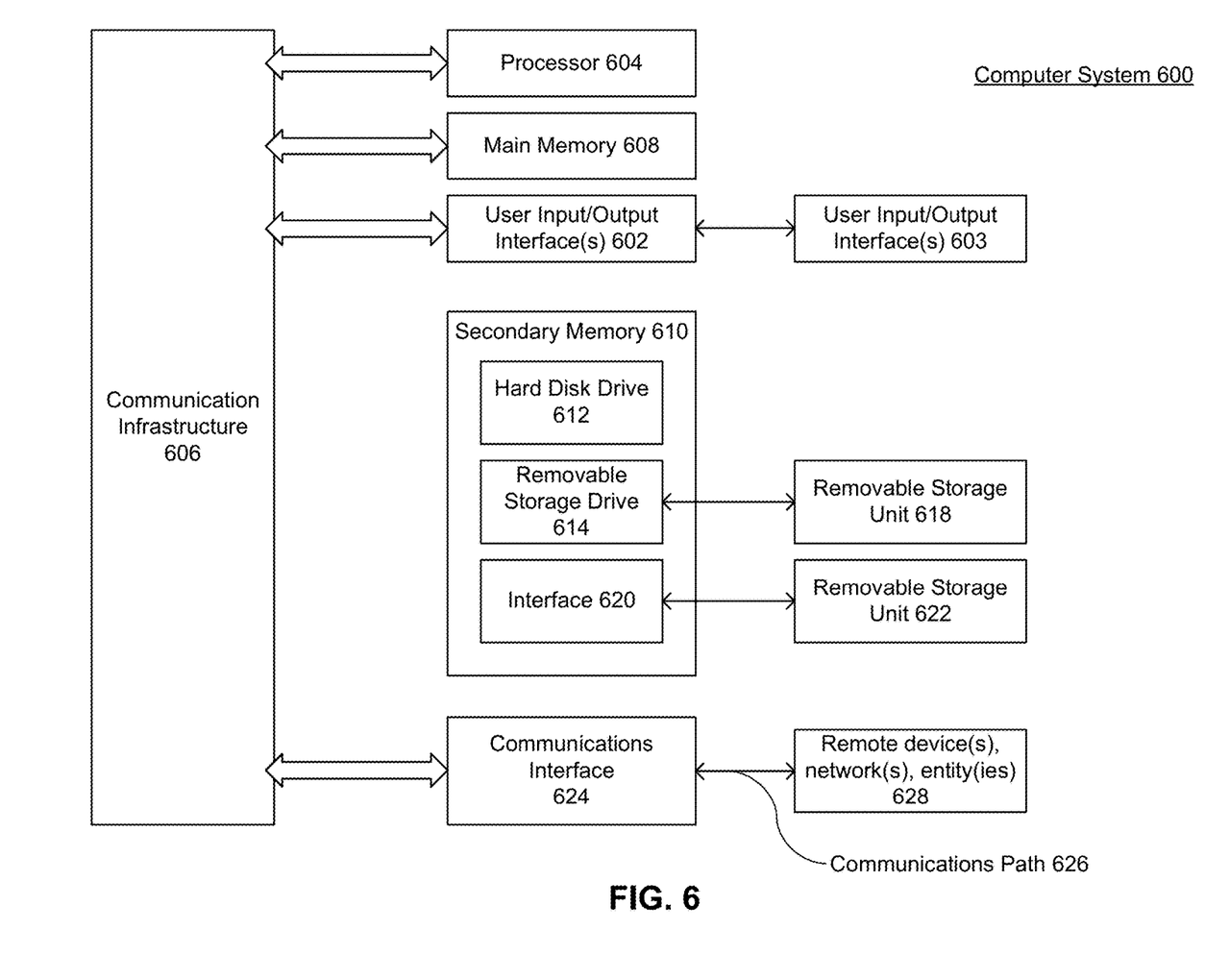
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc. as well as non-graphical applications, such as training of machine learning models (e.g., efficient back propagation).

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:
1. A computer implemented method, comprising:
    extracting, by one or more computing devices, features from an input by a feature extractor;

processing, by the one or more computing devices, the features by transfer layers configured as a deep neural network to produce a transfer output;

classifying, by the one or more computing devices, the input with a label by a label predictor implemented as a deep neural network, based on the transfer output;

classifying, by the one or more computing devices, the input as either a labeled source input or an unlabeled target input by a domain classifier; and back propagating, by the one or more computing devices, a loss at the domain classifier to the domain classifier and the transfer layers.

2. The computer implemented method of claim 1, wherein back propagating the loss at the domain classifier to the transfer layers is configured to minimize reliance on labeled source inputs by the transfer layers over successive inputs.

3. The computer implemented method of claim 1, wherein back propagating the loss at the domain classifier further comprises:

back propagating, by the one or more computing devices, the loss at the domain classifier to the domain classifier by adjusting a weight of the domain classifier to reduce the loss; and back propagating, by the one or more computing devices, the loss at the domain classifier to the transfer layers by adjusting a weight of the transfer layers to increase the loss.

4. The computer implemented method of claim 1, further comprising:

back propagating, by the one or more computing devices, a loss at the label predictor to the transfer layers.

5. The computer implemented method of claim 1, wherein the feature extractor is configured as a deep neural network.

6. The computer implemented method of claim 5, wherein neurons of the feature extractor are implemented in a fixed configuration.

7. The computer implemented method of claim 5, wherein the deep neural network of the transfer layers comprises fewer neurons than the deep neural network of the feature extractor.

8. A system, comprising:
a memory configured to store operations; and
one or more processors configured to perform the operations, the operations comprising:
extracting features from an input by a feature extractor,
processing the features by transfer layers configured as a deep neural network to produce a transfer output,
classifying the input with a label by a label predictor implemented as a deep neural network, based on the transfer output,
classifying the input as either a labeled source input or an unlabeled target input by a domain classifier, and
back propagating a loss at the domain classifier to the domain classifier and the transfer layers.

9. The system of claim 8, wherein back propagating the loss at the domain classifier to the transfer layers is configured to minimize reliance on labeled source inputs by the transfer layers over successive inputs.

10. The system of claim 8, wherein back propagating the loss at the domain classifier further comprises:

back propagating the loss at the domain classifier to the domain classifier by adjusting a weight of the domain classifier to reduce the loss; and back propagating the loss at the domain classifier to the transfer layers by adjusting a weight of the transfer layers to increase the loss.

11. The system of claim 8, the operations further comprising:

back propagating a loss at the label predictor to the transfer layers.

12. The system of claim 8, wherein the feature extractor is configured as a deep neural network.

13. The system of claim 12, wherein neurons of the feature extractor are implemented in a fixed configuration.

14. The system of claim 12, wherein the deep neural network of the transfer layers comprises fewer neurons than the deep neural network of the feature extractor.

15. A computer readable storage device having instructions stored thereon, execution of which, by one or more processing devices, causes the one or more processing devices to perform operations comprising:

extracting features from an input by a feature extractor;

processing the features by transfer layers configured as a deep neural network to produce a transfer output;

classifying the input with a label by a label predictor implemented as a deep neural network, based on the transfer output;

classifying the input as either a labeled source input or an unlabeled target input by a domain classifier; and back propagating a loss at the domain classifier to the domain classifier and the transfer layers.

16. The computer readable storage device of claim 15, wherein back propagating the loss at the domain classifier to the transfer layers is configured to minimize reliance on labeled source inputs by the transfer layers over successive inputs.

17. The computer readable storage device of claim 15, wherein back propagating the loss at the domain classifier further comprises:

back propagating the loss at the domain classifier to the domain classifier by adjusting a weight of the domain classifier to reduce the loss; and back propagating the loss at the domain classifier to the transfer layers by adjusting a weight of the transfer layers to increase the loss.

18. The computer readable storage device of claim 15, further comprising:

back propagating a loss at the label predictor to the transfer layers.

19. The computer readable storage device of claim 15, wherein the feature extractor is configured as a deep neural network.

20. The computer readable storage device of claim 19, wherein neurons of the feature extractor are implemented in a fixed configuration.

* * * * *